United States Patent [19]

Nakamura et al.

[11] Patent Number: 4,957,247
[45] Date of Patent: Sep. 18, 1990

[54] FILM WINDING APPARATUS

[75] Inventors: Masao Nakamura, Machida; Norio Sakamoto, Sagamihara; Takashi Ito, Hachioji, all of Japan

[73] Assignee: Konica Corporation, Tokyo, Japan

[21] Appl. No.: 278,100

[22] Filed: Nov. 30, 1988

[30] Foreign Application Priority Data

Dec. 3, 1987 [JP] Japan .................... 62-306731

[51] Int. Cl.⁵ .................... B65H 18/10; B65H 19/28
[52] U.S. Cl. .................... 242/67.1 R; 242/67.2; 242/74; 242/56 A
[58] Field of Search .............. 242/67.1 R, 67.2, 56 A, 242/56 R, 74

[56] References Cited

U.S. PATENT DOCUMENTS

| | | | |
|---|---|---|---|
| 3,737,113 | 6/1973 | Yabe et al. | 242/67.1 R |
| 4,010,912 | 3/1977 | Dreher et al. | 242/67.1 R |
| 4,099,682 | 7/1978 | Benuska | 242/67.1 R X |
| 4,466,579 | 8/1984 | Nitsch et al. | 242/67.1 R |
| 4,770,361 | 9/1988 | Maeda | 242/67.1 R |
| 4,834,310 | 5/1989 | Ikariya et al. | 242/74 |
| 4,844,369 | 7/1989 | Kanayachi | 242/67.2 X |

Primary Examiner—John M. Jillions
Attorney, Agent, or Firm—Finnegan, Henderson, Farabow, Garrett, and Dunner

[57]   ABSTRACT

A film winding apparatus comprises a positioning device for a spool of a photographic film having a lateral rib formed on the external circumference of the core of the spool, around which a photographic film with a predetermined length is wound, and this apparatus consists of a driving shaft with a chuck to hold the spool, a stopping device with which the rib comes into contact to stop the rotation of the spool, a one way clutch attached to the driving shaft to prevent the shaft from rotation, and a motor for controlling a driving device connected with the driving shaft and a drive device for controlling the stopping device to stop the rotation of the spool at a predetermined position.

4 Claims, 11 Drawing Sheets

FILM WINDING APPARATUS

FIELD OF THE INVENTION

The present invention relates to an improvement of a photographic film winding apparatus comprising a positioning device for a film spool. The spool is usually provided with a slit at the side of the core for taking up the photographic film. The rotation of the spool must be stopped accurately at the position exactly facing a leading end of the photographic film.

BACKGROUND OF THE INVENTION

In general, in order for a series of continuous operations comprising, for example, the operation for drawing out the photographic film from a master roll, the operation for measuring the length of the film, the operation for cutting the film to a specified length and the operation for stopping the leading end of the film at the exact position for being wrapped around a spool to be speeded, it is desirable for each of the devices for performing the operations to be provided on each of plural nests comprising the devices for performing the operations. The nest being arranged equidistantly on a rotary turret so that all the operations ranging from the measuring to taking up can be completed during each rotation of the turret. More specifically, by being arranged in this fashion, the film scrolls in the quantity corresponding to the number of the nests can be manufactured efficiently during each rotation of the turret.

On each of the nests arranged on the turret, in order for the leading end of the film formed after undergoing the measuring and cutting processes to be stopped exactly for being engaged with the spool held by a spool chucking device, it is necessary for the slit of the spool to be positioned so as to exactly match the leading end of the film and then for the operation for feeding the leading end of the film to the spool to be performed consecutively.

In the conventional spool positioning mechanisms the spool holding unit is linked to a shaft which receives the rotary force from a torque motor or a hysteresis clutch which produces the slip and a stopper slidably in contact with the spool so that the spool, can be positioned by causing a rib provided round the external circumference of the spool to come into contact with the stopper as the spool rotates. However, the rib bounces instantaneously when the rib comes into contact with the stopper following the increase in the speed of revolution through the increase in the torque of the torque motor and that in the transmission torque of the hysteresis clutch. That is, the spool is forced to rotate reversely against the turning force of the torque motor before the spool recovers its rotation in normal direction to come into contact again with the stopper. Such bouncing of the rib also occurs at the time of its re-contact with the spool to cause the spool to turn in reverse and normal directions alternately, though such bouncing will gradually attenuate to complete the positioning of the spool after a considerable length of time. Besides, in the conventional positioning mechanism, it is difficult for the timing of the film leading end feed to be adjusted to the timing of the spool positioning, as the poor adjustment of such timing can cause jamming of the film.

SUMMARY OF THE INVENTION

The present invention relates to the improvement of a film winding apparatus, comprising a positioning device for a spool of a photographic film having a lateral rib formed on the external circumference of the core thereof, around which a photogrpahic film with a predetermined length is wound, the device comprising
  (a) a driving shaft with a chuck to hold the spool,
  (b) a stopping device with which the rib comes into contact to stop the rotation of the spool.
  (c) A backstop means attached to the driving shaft to prevent the driving shaft from rotating.
  (d) means for controlling a driving device connected with the driving shaft and means for controlling the stopping device to stop the rotation of the spool at a predetermined position.

An object of the present invention is to provide a positioning mechanism for the spool to accomplish the positioning in a shorter period of time than that of the conventional positioning mechanisms where relatively long periods of time required for positioning have been one of the problems to be solved.

In order to attain the above-mentioned object, the positioning mechanism for the spool according to the present invention comprises a drive shaft for driving the rotatable spool and a stopping device to come into contact with the rib provided around the core of the spool. The stopping device is characterized by a backstop device provided on drive shaft, whereby the spool can be prevented from bouncing at the time of positioning.

DETAILED DESCRIPTION OF THE PREFERRED EMBODIMENT

The present invention will be explained hereunder in reference to each of the embodiments described in the attached drawings.

Figure 1:
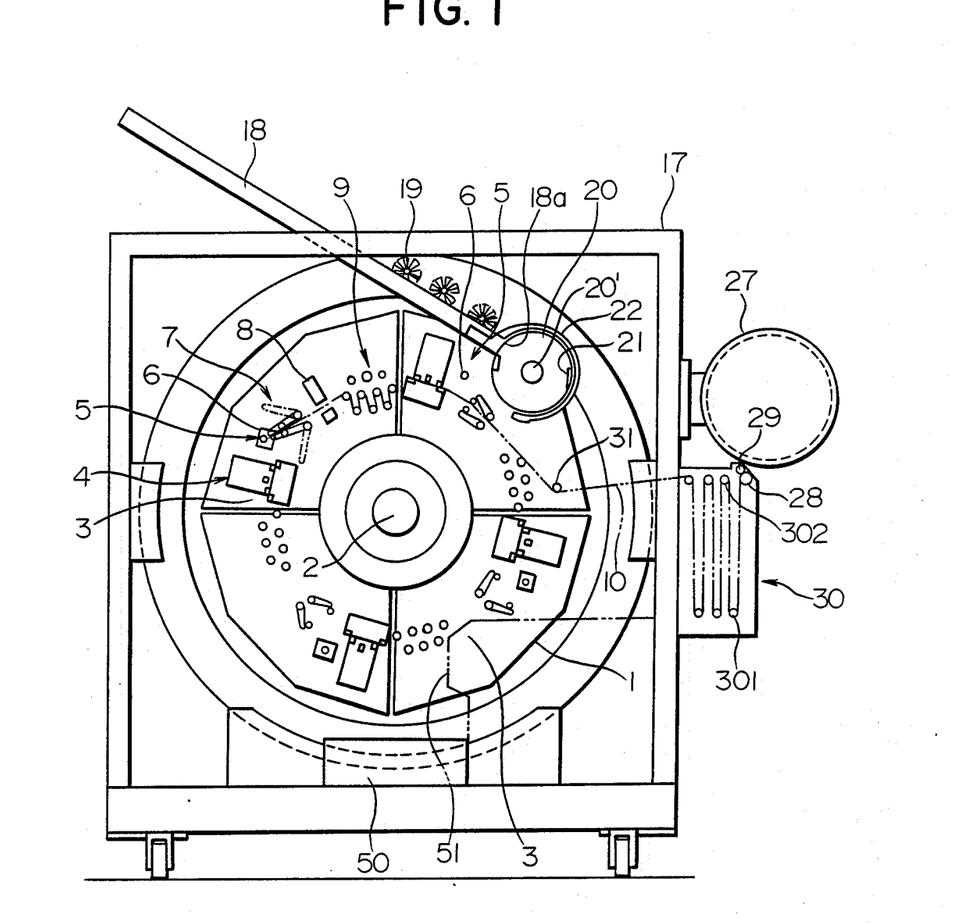
FIG. 1 is a drawing showing the concept of a scroll manufacturing machine.

FIG. 1 is a schematic front view of the film scroll manufacturing machine showing its essential mechanism, wherein the numeral 1 represents a turret which turns counterclockwise around a central axis 2 supported by a stationary frame 17, at a constant speed, and the plural number of nests (four nests are shown in FIG. 1) are arranged equidistantly on turret 1. A film cutting device 4, a spool chuck 5 with a drive device 15 to turn the spool in the take-up direction, a locking device 7 to cause a leading end part 10a of a film 10 to be locked to a spool 6 held by spool chuck 5, a film holding device 8 and a film measuring device 9 are arranged respectively along the circumferential area of each of the nests 3 in said order beginning from the end of the turret in its direction of turn.

Figure 2A:
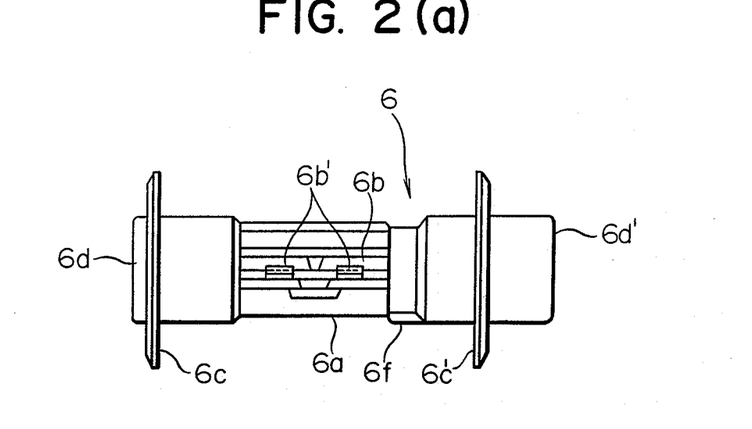
FIGS. 2(a) and (b) are the side view and the cross-sectional view of the spool used in the machine of FIG. 1 respectively.
Figure 2B:
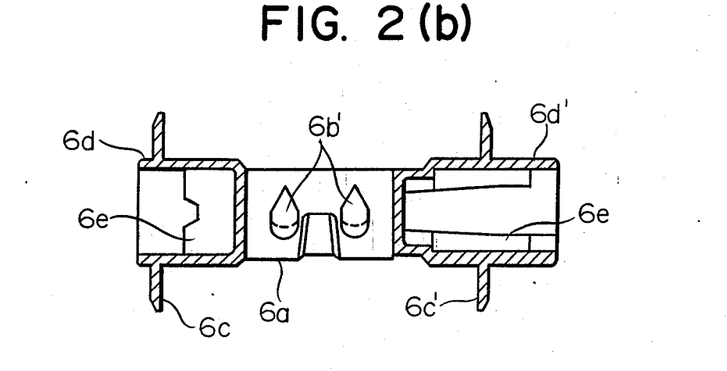

As shown in FIGS. 2(a) and (b), spool 6 has a barrel 6a with a slit 6b, and a locking click 6b' to lock a locking hole 10c formed in the end part 10a of film 10 is provided in slit 6b; a short boss 6d and a long boss 6d' are provided on the outside of flanges 6c and 6c' which are provided on both of the axial ends of the barrel 6a, and a beam 6e to engage with the front forks of spindles 5a and 5b which constitutes the spool chuck 5, provided in the internal room of the barrel; and 6f represents a positioning rib provided on the external circumference of the barrel 6a.

Figure 3:
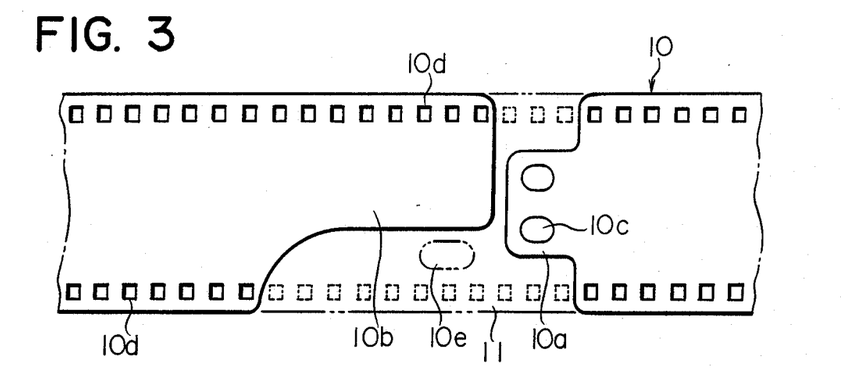
FIG. 3 is a plan view of film cutting unit.

As shown in FIG. 3, film 10 has perforations 10d provided on both sides from the beginning, and the latent images (not shown in the drawing) such as those of the frame number and trademark are printed in the picture area near the perforations. Film 10 also has the positioning holes 10e to determine the number of frames in a film scroll such as 12 frames, 24 frames and and 36 frames are perforated in the film at intervals corresponding to the length of the film in a film scroll. Each of the positioning holes 10e are left in the end piece 11 (indicated with slant lines) of the film to be thrown away after serving as the front end 10a or the rear end 10b of a film to be wound around a spool which will be thrown away later, so that the positioning holes will not remain in the film.

Spools 6 are loaded in advance in a spool chute 18 mounted slantwise on the stationary frame 17 so that the spools can be brought in to line towards the bottom end mouth 18a of the chute due to the inclination of spool chute 18 and the feeding by the plural number of brush rollers 19. The spools 6, in a line towards bottom end mouth 18a, are received in spool receiving groove 21 one by one and carried to the side surface of the turret 1 at a constant interval.

Spool feed drum 20 consists of two pieces of discs to be turned clockwise by a drive motor (not shown in the drawing) linked to a shaft 20', and the insides of the bosses 6d and 6d' at both ends of the spool 6 fit in the spool receiving grooves provided along the external circumference of each disc.

Figures 4, 5:
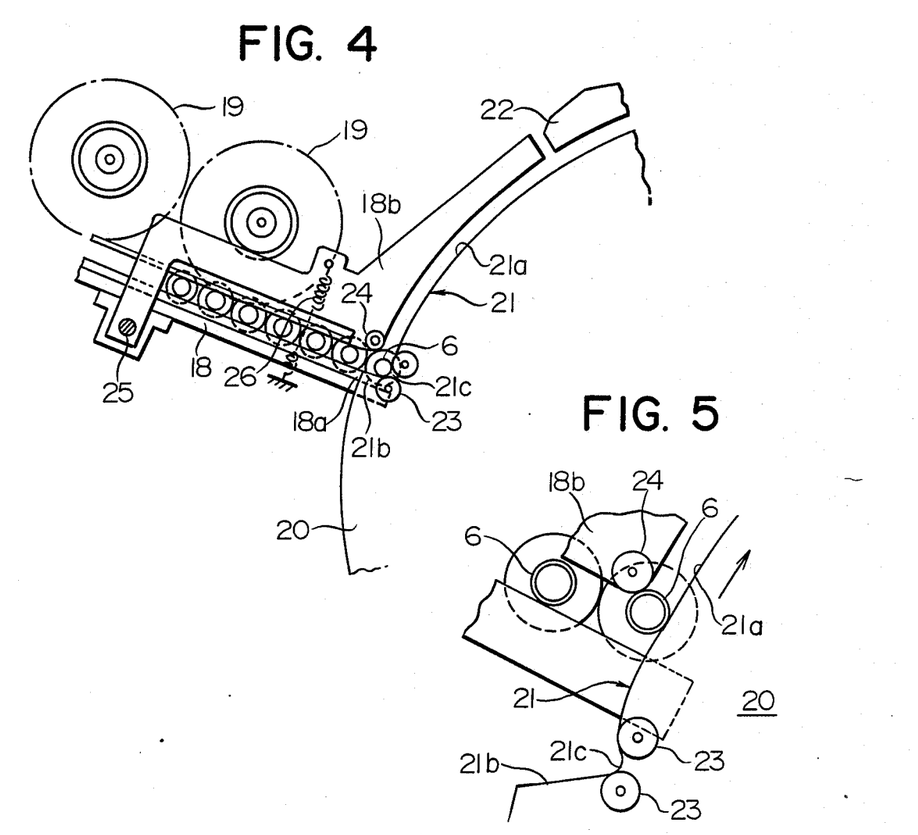
FIG. 4 shows the relationship between the spool feed drum and the spool chute.
FIG. 5 shows the function of the spool receiving groove.

As shown in FIG. 4, spool receiving groove 21 comprises the sloped portion 21a which gradually deepens from the external circumference towards the back in the direction of rotation, a step 21b provided at the deepest portion of the groove and a concaved pocket 21c.

As shown in FIG. 5, therefore, when the drum 20 turns, the spools 6 in line towards the bottom end mouth 18a of the chute are introduced into the spool receiving groove 21 by way of the slope 21a. At this point, however, the spools 6 are regulated by an upper mouth member 18b of the bottom end mouth 18a, and the spools are able to pass upper mouth member 18b when the spool fits in the pocket 21c provided at the deepest portion of the slope 21a. That is, only one of the spools fitted into the pocket 21c is permitted to pass upper mouth member 18b in order to be carried to the side surface of the turret 1 passing between the drum and outer guide member 22 extending along the major portion of the circumference of the drum. Pocket 21c is provided with two free rollers which are disposed opposite to each other to carry the spool fitted in the pocket so that the spool is caused to rotate due to the friction occurring while the spool is carried along the outer guide member 22, and the spool can be prevented from being damaged due to the friction while being transferred.

Upper mouth member 18b is provided with an axially supported free roller 24 in order to prevent the corner of the member from biting into the spool. Besides, the outer guide member is disposed so as to be able to get away from the drum 20 by swinging around the axial supporting point 25 linked to the spool chute 18 against a tension spring 26 so that the corner of the outer guide member can be prevented from biting into the spool.

Film 10 is wound into the form of a roll and loaded in a film drum 27. The film is drawn out from film drum 27 by means of a drive sprocket 28 and a pad roller 29 which is pressed against drive sprocket 28 in order to be locked to the slit of the spool 6 set on the spindles 5a and 5b of the spool chuck 5 after passing a film accumulator 30. The film then passes under a guide roller 31 axially supported with the stationary frame 17 of the turret 1, onto a group of stationary rollers 9a of the measuring device 9, between upper and lower members 8a and 8b constituting a film holding device 8, between upper and lower chutes 7a and 7b constituting a locking device 7, and between nip rollers 7c and 7d. The locking of the film end to the spool 6 is to be done manually by the operator at the time of the initial film setting, but the subsequent locking can be done automatically by the function of the locking device.

Film accumulator 30 is internally provided with a group of dancer rollers 301 and a group of stationary rollers 302 so that the film can be made to run zigzag to keep the tension of the film constant. More specifically, the running speed of the film driven by the constant-speed turning of the drive sprocket 28 is synchronized with the number of revolutions of the turret 1, since this is necessary in order to absorb the variation of the film feed speed which can occur when locking the film end to the spool and when measuring or cutting the film, as are explained later.

Figure 6:
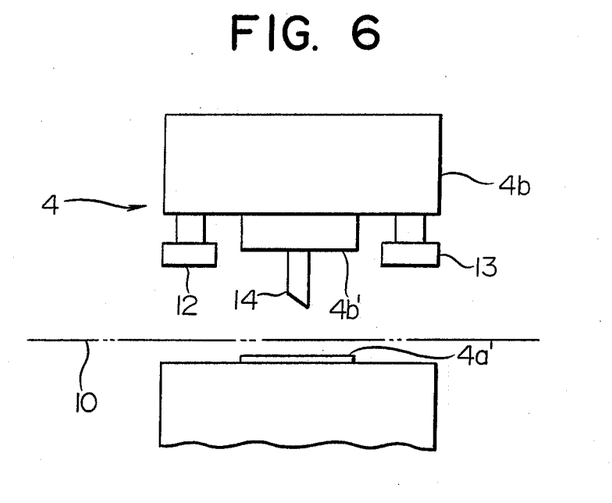
FIG. 6 is a schematical front view of the film cutting unit.
Figure 7:
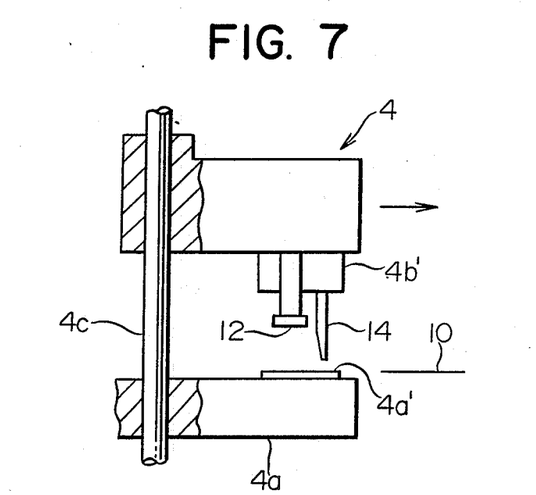
FIG. 7 is a schematic side view of the film cutting unit.

As shown in FIG. 6 and FIG. 7, cutting device 4 is provided with a stationary blade (lower blade) 4a including a cutting blade 4a' and a movable blade (upper blade) 4b including a cutting blade 4b' which comes into frictional contact with the cutting blade 4a'. The film cutting device normally stands behind the film path line, as shown in FIG. 7, so as not to disturb the running of the film 10, but, at the time of the cutting operation, the film cutting device is caused to move in the direction indicated with an arrow by an operating device (not shown in the drawing), which moves as a driving device while slidably in contact with a cam (not shown in the drawing) provided on the side of the stationary frame 17 of the turret 1, to catch the film 10 for cutting the film with the movable blade 4b as the blade moves downward along a guide shaft 4c. Film holders 12 and 13 for holding both ends of the cut film on the front, rear and top of the stationary cutting blade 4a are provided on the front and rear of the movable cutting blade 4b, and a positioning pin 14 to fit in the positioning hole 10e in the film 10 is provided at the bottom surface of the cutting blade 4b' of movable cutting blade unit 4b. Positioning pin 14 is provided to determine the reference position for film cutting, whereby the cutting position and the position of latent image always coincide with each other.

Figure 8A:
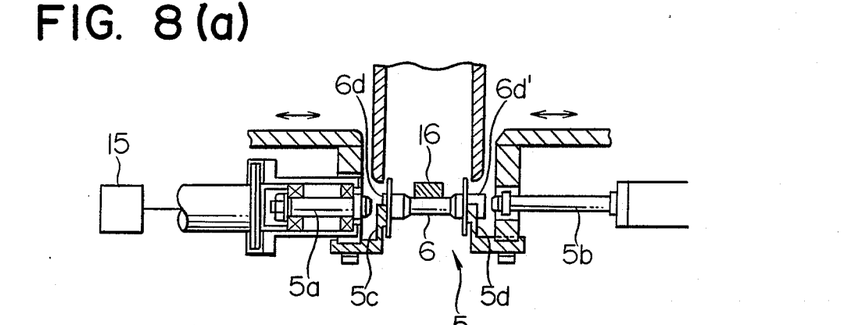
FIGS. 8(a) and (b) are the front views of the spool chuck unit respectively.
Figure 8B:
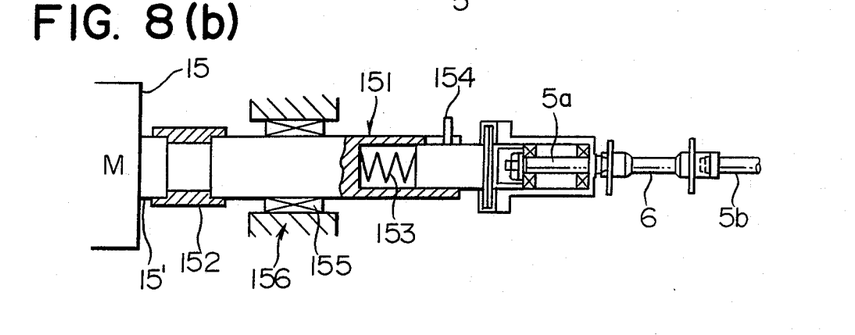

As shown in FIG. 8(a), said spool chuck 5 is provided with spindles 5a and 5b disposed opposite to each other. As shown in FIG. 8(b), with respect to the spindle 5a, a spring 153 in a compressed condition is fit in the front room of a shaft 151 where an output shaft 15' of the drive device 15 is connected through a coupling 152, so that a pin 154 can be slid against the spring 153 to release the chuck by means of an appropriate device (not shown in the drawing). The spindle 5b can also be slid by means of a solenoid or the like.

Figures 12, 13:
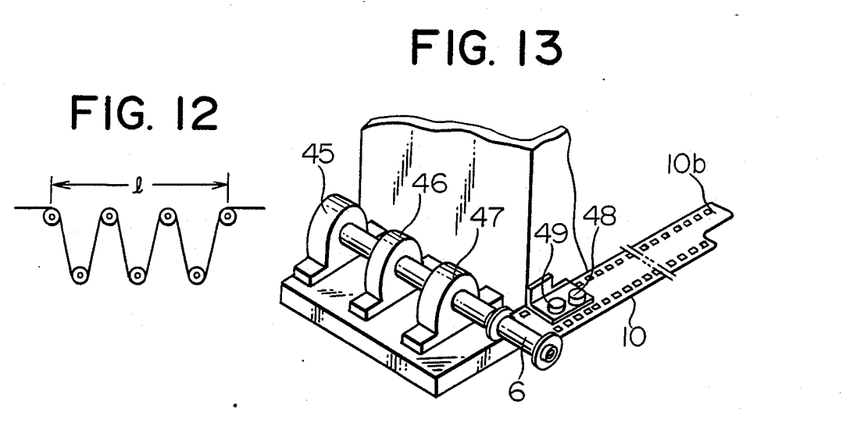
FIG. 12 is an explanatory drawing of the measuring operation.
FIG. 13 is an oblique view of the spool drive device.

As shown in FIG. 13, drive device 15 causes the spool 6 to be turned only in the take-up direction and comprises a motor 45, hysteresis clutch 46 and a brake 47. The rotational torque of the motor 45 is transmitted to the spindle 5a through the hysteresis clutch 46. A backstop or reverse turn preventive device 155 is provided at the middle of the shaft 151 with the spindle 5a. The reverse turn preventive device 155 can be operated effectively with a one-way clutch fit in a bearing 156 as shown in FIG. 8(B).

Figure 9:
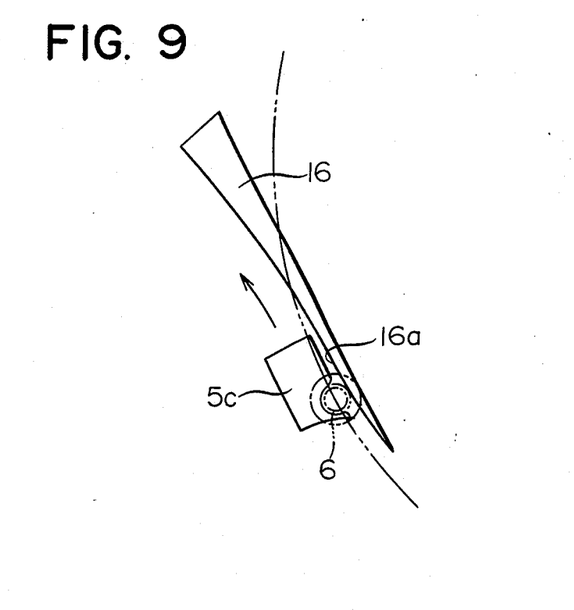
FIG. 9 shows the relationship between the spool receiving plate and the stationary guide member.

Spool receiving plates 5c and 5d with concaves, wherein the bosses 6d and 6d' at both ends of the spool can be fit, are provided within the moving range of spindles 5a and 5b so that the spool receiving plates can be moved in either an approaching direction or a departing direction by an appropriate device (not shown in the drawing). Spool receiving plates 5c and 5d temporarily receive the spools 6 transferred to the side surface of the turret 1 from spool feed drum 20. The spools 6 temporarily received by the spool receiving plates are stably held between the spool receiving plates and the stationary guide member 16 and are transferred by sliding on the guiding surface 16a of the stationary guide member 16 towards the direction indicated with an arrow as the turret 1 turns, as shown in FIG. 9. The spools 6 are chucked with spindles 5a and 5b while being transferred.

Figure 10A:
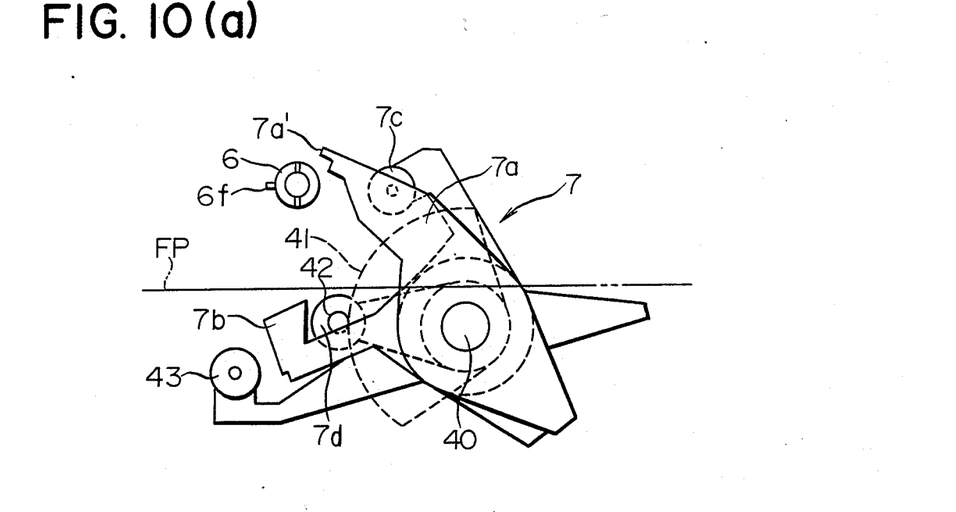
FIGS. 10(a) and (b) are the front views of the film locking device to describe its function respectively.
Figure 10B:
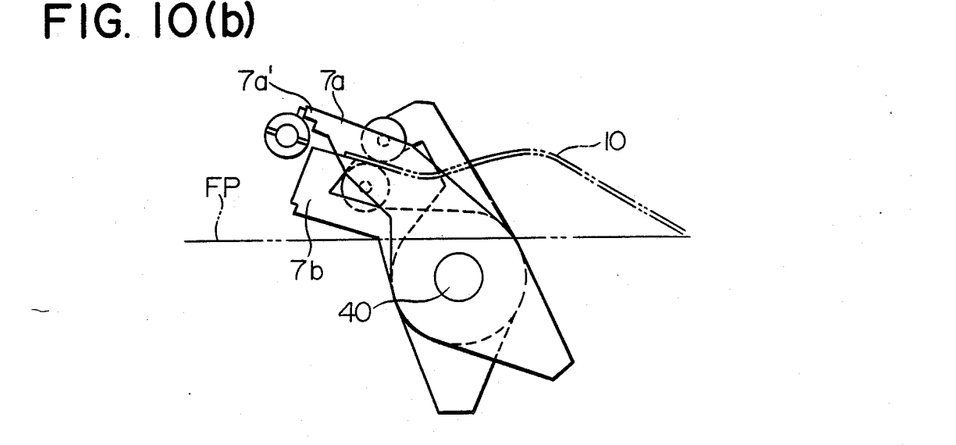

As shown in FIGS. 10(a) and (b), film locking device 7 is provided with upper and lower chutes 7a and 7b, which open and close around an axis 40 by means of an appropriate drive device, and nip rollers 7c and 7d, which also open and close around the axis 40. When said upper and lower chutes are opened, as shown in FIG. 10(a), the upper chute 7a is above the spool 6 set on the spindles 5a and 5b of spool chuck 5, whereas the lower chute is below the film path line. When the upper and lower chutes are closed, as shown in FIG. 10(b), the upper chute 7a advances to the position of the spool and then oscillates downward to cause the stopper 7a' formed on its front to slide into contact with the upper circumference of the spool 6, whereby the spindle 5a of the spool chuck 5 connected to the drive device 15 causes the spool 6 to turn to determine the position of the slit 6b, by causing the positioning rib 6f at the barrel 6a of the spool to come into contact with the stopper. On the other hand, the lower chute 7b oscillates upward to come into contact with the lower surface of the upper chute 7a. The film guide is formed on the surface where the upper and lower chutes come into contact with each other.

The positioning operation is accomplished when the spool turned by drive device 15 causes the lateral rib 6f on the circumference of the spool to contact the stopper 7a', even when the number of revolutions of the spool (a rotable body) is increased by increasing the torque of the motor 45. The backstop device 155 at the middle of the shaft 151 works so that the bouncing of rib 6f occurrs instantaneously when the rib 6f has come into contact with the stopper 7a, that is, the force to cause the spool to turn against the turning force of the motor can be reduced to a negligible level and attenuated so that the time required for positioning can be reduced substantially.

As shown in in FIG. 10(a), when nip rollers 7c and 7d are opened, they are disposed opposite to each other with the film path line interposed. As described previously, before the lower chute 7b oscillates to come into contact with the upper chute 7a, the end part 10 of the film on the film path line is interposed between the chutes, and the lower chute oscillates upward. At the time of this oscillatory motion, a sector gear 41 axially supported by the axis, turns counterclockwise to cause a gear meshing therewith to turn clockwise. Thus, the lower roller 7d meshing with gear 42 is caused to turn reversely. As a result, the leading end part 10 of the film held between gear 42 and lower roller 7d is pulled in a reverse direction to the running direction of the film to be transferred upward, and is inserted between the lower chute 7b and upper chute 7a while moving along the upper chute 7a as shown in FIG. 10(b).

Then, the clockwise turn of said sector gear 41 causes the lower roller 7d to turn counterclockwise to feed the leading the end of the interposed film towards the spool 6. In this case, as described previously, the spool 6 is positioned by the front part 7a' of the upper chute 7a, and, since the film guide formed at the surface where upper and lower chutes 7a and 7b come into contact with each other matches exactly with the slit 6b, the leading end of the film sent out by the nip rollers 7c and 7d is caused to be inserted into slit 6b of the spool 6 with the locking hole at the leading end of the film locked by the locking click in the slit. Also, in FIG. 10(a), 43 represents a touch roller which turns around axis 40, and comes into contact with the lower surface of the spool 6 and supports the film taken up by the spool.

Figure 11:
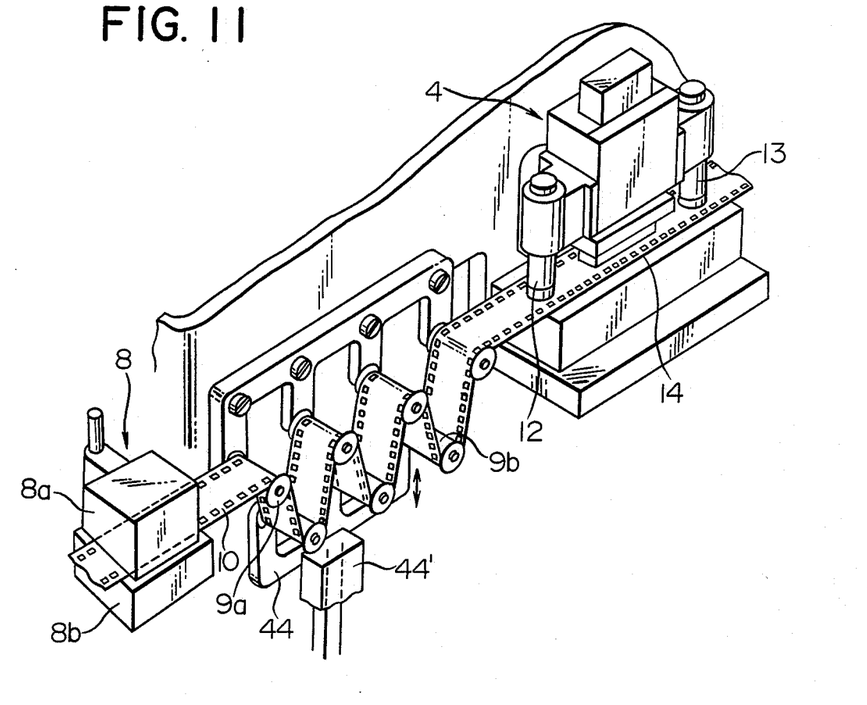
FIG. 11 is an oblique view showing the film measuring device, film cutting device and film holding device, respectively.

As shown in FIG. 11, film measuring device 9 comprises a plural number (four are shown in the drawing) of stationary rollers 9a arranged equidistantly and a group of dancer rollers 9b arranged on the movable member 44 so as to permit the film to pass between the rollers of the group of stationary rollers 9a from above the film path line downward towards the center of the turret. The group of dancer rollers 9b normally stands behind the film path line so as not to disturb the run of the film 10 and is moved towards the fore by an appropriate drive means, for example, an operating device (not shown in the drawing) which is slidably in contact with a cam (not shown in the drawing) provided on the side of the stationary frame 17 of the turret 1, whereby the group of dancer rollers is permitted to come on the upper surface of the film 10 and moves downward therefrom to cause the film to run zigzag as shown in the drawing.

As shown in FIG. 12, the length l of the film measured between the leftmost and rightmost rollers of the group of stationary rollers 9a is longer than usual due to the arrangement for the zigzag run of the film, so that when the length of the film between two cut ends where the group of dancer rollers 9b is not operated is set, for example, as the length for 12-frame film. The lengths of the films for larger number of frames such as the 24-frame and 36-frame films can be set either by adjusting the quantity of movement of the dancer roller group 9b or by changing the number of the dancer rollers 9b.

The measurement by measuring device 9 that is, the downward movement of the dancer roller group 9b' takes place almost simultaneously with the start of the operation of the cutting device 4 of the following nest. Dancer roller group 9b stops for a while before reaching the lowermost point due to the action of the stopper (not shown in the drawing) to permit the positioning pin 14 provided on the moving blade 4b of cutting device 4 to fit in the positioning holes 10e provided according to the measuring pitch during such a pause. In this condition, the stopper is released, and the dancer roller group 9b resumes to move downward due to the action of a spring (not shown in the drawing). This downward movement of the dancer roller group causes the film 10 to be pulled slightly so that the end of the positioning hole 10e comes into contact with the positioning pin 14 to enable the determination and fine adjustment of the cutting position of the film 10.

The measuring operation by this measuring device 9 takes place simultaneously with the locking operation of film locking device 7, but the film 10 is held by the film holding device 8 between two devices so that the two actions will not interfere with each other. The film holding device 8 comprises an upper member 8a and a lower member 8b. The upper member 8a normally stands behind the film path line so as not to disturb the run of the film 10 but is caused to move onto the surface of the film 10 by an appropriate drive device before the film is cut with the film cutting device 4 installed on the same nest, and the upper member starts to descend almost simultaneously with the cut of the film in order to hold the film 10.

As described previously, the motor 45 constituting the drive device 15 whereto a spindle 5a of the spool chuck 5 is linked, is energized immediately before the upper and lower chutes 7a and 7b and the nip rollers 7c and 7d return to their initial positions respectively following the release of the film 10 caused by the upward movement of the upper member 8a of the film holding device 8. Almost simultaneously, the hysteresis clutch 46 is also energized. Then, when the brake is set to off-position, the rotational torque of the motor 45 is transmitted to the spool 6 set to the spindle 5a of the spool chuck 5, but both ends of the film are still held with the film holding members 12 and 13 at the time immediately following the cut of the film 10 by the moving blade 4b of the film cutting device 4 installed on the following nest, and the hysteresis clutch 46 is still sliding. The torque is transmitted to the spindle 5a through the hysteresis clutch 46 at the moment when both ends of the film are released by the upward movement of the movable blade 4b of cutting device 4 so that the spool 6 is caused to turn to start the takeup of the film. Simultaneously, the movable member 44 provided with the dancer roller group 9b of film measuring device 9 starts to ascend along the guide block 44' (towards the circumferential direction of the turret) so as not to act as a resistance to the film to be taken up. When the rear end 10b of the film to be taken up is detected by the first sensor, brake 47 reduces the speed of the motor 45 using the signal from the first sensor. When the second sensor 49 has detected the rear end 10b of the film, the signal from the sensor acts to stop the rotation of the spindle 5a completely.

In FIG. 1, the numeral 50 denotes a box for collecting the end pieces 11 of the films to be thrown away, produced in cutting the films with said cutting device 4. The film end pieces 11 are stuck to the vacuum sticker (not shown in the drawing) installed on the stationary blade 4a of the cutting device 4 in order to be carried onto collection box 50 where the film end pieces are released. The numeral 51 denotes a transfer device with a film end holding device (not shown in the drawing) which holds the trailing end 10 of the film wound around the spool 6 and transfers the film to the next process, for example, a device for inserting the film into the film cassette.

Figure 14:
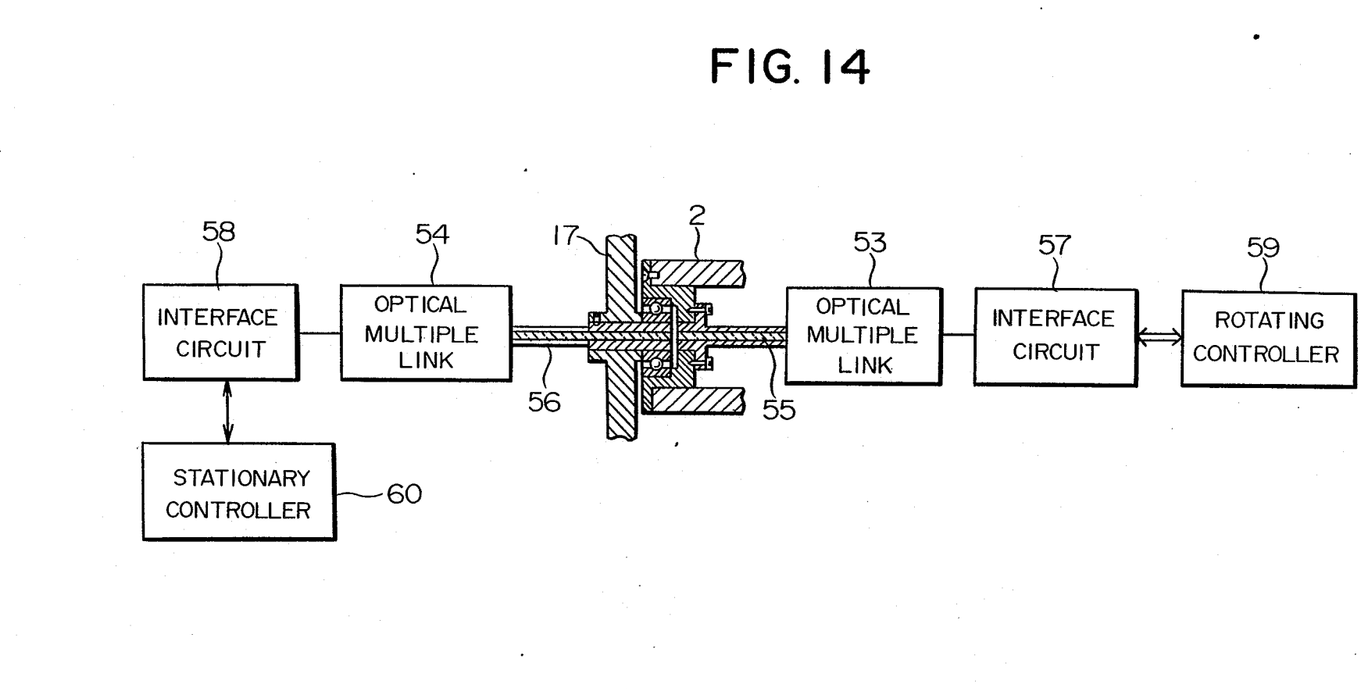
FIG. 14 is an explanatory drawing showing the signal transmission equipment between the turret side and the stationary frame.

FIG. 14 shows actuating signal transmission equipment for the communication between the side of the turret and the side of the stationary frame.

The turret turns around a shaft 2 axially supported by the stationary frame 17, and so it is necessary for the driving force of the various processing devices installed on each of the nests on the turret to be transmitted through the cam installed on the stationary frame. It is also necessary for the detection of the signal and the control of the motor, solenoid, actuator, photoconductive proximity sensor and so on, installed on the turret to transmit the signal to the turret side from the stationary frame, and the signals obtained from the sensors to the stationary frame side from the turret side.

In this embodiment, therefore, the two-way communication system of optical communication through the shaft 2 is provided. In the case of this embodiment, optical fibers 55 and 56 are passed through the shaft 2 using optical multiplex links 53 and 54 with different wavelengths for the transmission of the signals between the side of turret 1 and the side of the stationary frame 17. This system enables simultaneous two-way communication through a single shaft at a high speed. This system is adopted in the case of the two-way communication system for transmitting the data on the time sharing basis and inevitably produces the time periods, wherein the one-way communication is unable to do so, and this is the drawback to the high-speed communication.

In the above case, however, when the system is composed of the FM communication system instead of the optical communication system, the wireless communication system can be used for the control. The wireless communication system, however, is vulnerable to noise despite its conveniences. Thus, in the case of this embodiment placing the emphasis on the sureness and stability of the operation, the control by the optical link is preferable. This, however, does not necessarily mean that the wireless communication system is unapplicable to this embodiment.

The function of the present invention is summarized as follows.

The film winding apparatus comprises (a) a movable upper chute which is installed above a path line of the film and has a tip which can approach and touch the spool.

(b) a movable lower chute which is installed below the film path line and can move towards the film path line until the lower chute touches a lower surface of the upper chute, and (c) upper and lower nip rollers which are installed in the vicinity of a film delivery point of the upper and lower chutes, pinch a leading part of the film, move along the upper chute, and send the pinched leading part of the film to the spool.

(d) the tip of the upper chute is used as a stopping device for positioning control of the spool by coming contact with the rib of the spool.

The functions of the present invention will be explained hereunder referring to FIGS. 15(a) through (i).

The above drawings are concerned with the relationship between the film locking device 7, film cutting device 4 and film holding device 8.

Figure 15A:
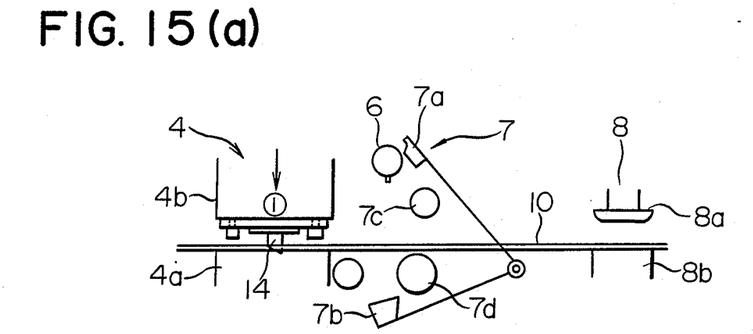
FIGS. 15(a) through (i) are the explanatory drawings showing the functions mainly that of the film locking device.
Figure 15B:
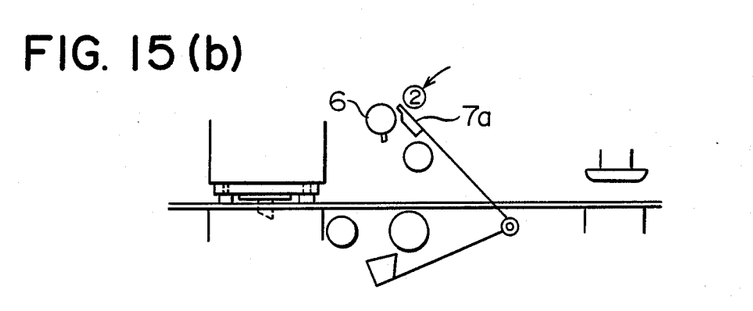

FIG. 15(a) shows the spool 6 set to the spool chuck 5. At this position, the measurement of the film 10 by the measuring device installed on a nest preceding this nest is completed, and the movable blade 4b of the cutting device 4 installed on this nest and the upper and lower chutes 7a and 7b which are at their standby positions in the back, are caused to move onto the film path line. In this case, the upper and lower chutes, 7a and 7b and the nip rollers 7c and 7d are in open standby positions respectively.

When the turret turns further, the movable blade 4b of the cutting device 4 moves downward as illustrated in FIG. 15 (b) ((1)). This causes the positioning pin 14 provided at the bottom of the movable blade 4b to fit in the positioning hole 10e of the film 10, and the film 10 is fixed at the points corresponding to the front and the rear of the stationary blade 4b with the film holders 12 and 13 which are located at the front and the rear of the movable blade 4b. Subsequently, the upper chute 7a oscillates as illustrated in FIG. 15(b) ((2)) to cause its front end to come into contact with the external circumference of the spool 6.

Figure 15C:
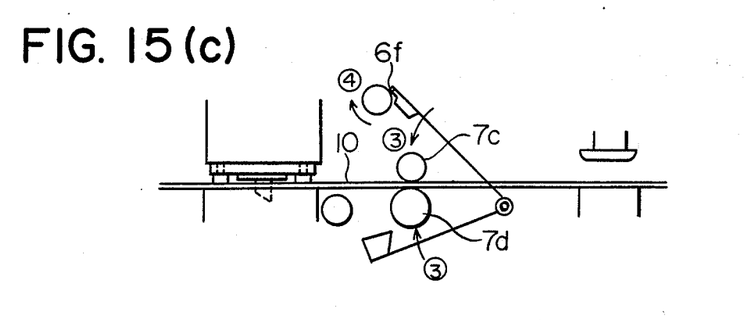

Then, the nip rollers 7c and 7d move in opposite directions as illustrated in FIG. 15(c) ((3)) to cause the film 10 to be inserted between the rollers. Almost simultaneously with this operation, the drive device 15 connected to a spindle 5a of the spool chuck 5, operates to turn the spool 6 ((4)). This causes the positioning rib 6f provided on the barrel 6a of the spool 6 to come into contact with the stopper 7a' at the front end of the upper chute 7a, to complete the orientation of the slit 6b provided on the barrel of the spool.

Figure 15D:
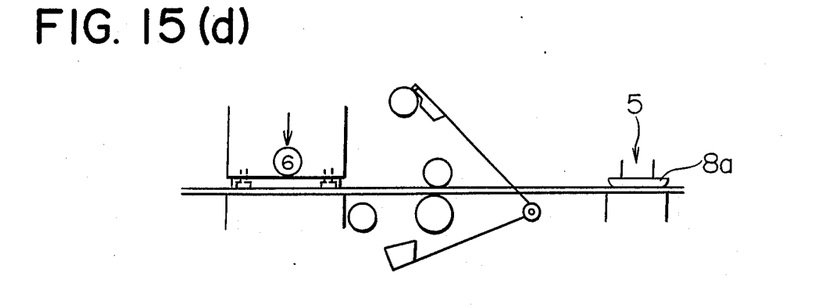

Then, the upper member 8a of the film holding device 8 moves down as illustrated in FIG. 15(d) ((5)) to hold the film 10 between the upper member 8a and the lower member 8b. Then, the movable blade 4b of the cutting device 4 moves downward further ((6)) to cut the film 10 between itself and the stationary blade 4a to form the front end 10a and the rear end 10b of the film.

Figure 15E:
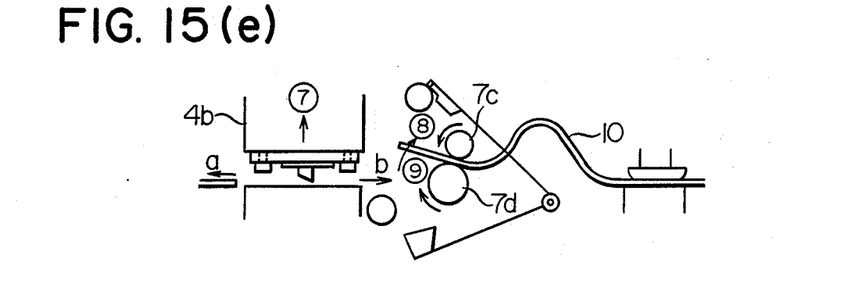

As shown in FIG. 15(e), the movable blade 4b of the cutting device 4 ascends ((7)) to release the leading end 10a and the trailing end 10b of the film which have been held with the film holders 12 and 13. Thus, the trailing end 10b of the film is taken up by the spool located on the preceding nest and pulled towards the direction indicated with an arrow, whereas the front end 10a of the same film is caused to turn reversely ((9)) due to the action of the sector gear caused by the upward oscillation of the nip rollers 7c and 7d, and the film is drawn in towards the direction indicated with an arrow. In this case, the film 10 is held with the film holding device 8, and so the film is caused to be kept curved.

Figure 15F:
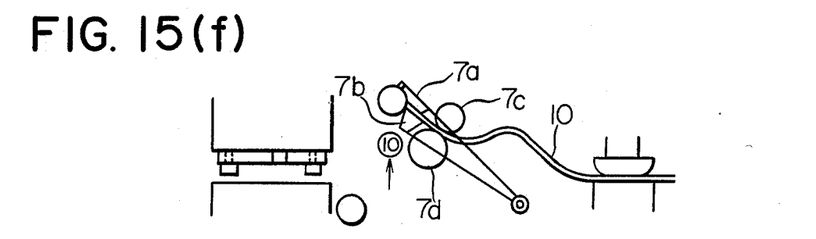

Thus, the nip rollers 7c and 7d oscillating upward stop to oscillate further when the front leading 10a of the film has come into contact the upper chute 7a as illustrated in FIG. 15(f). Then, the lower chute 7b ascends ((10)) following the upward oscillation of the nip rollers 7c and 7d to insert the leading end 10a of the film between the lower chute and the upper chute 7a. This causes the front end 10a of the film to be disposed opposite to the slit 6b of the spool 6.

Then, the nip rollers 7c and 7d turn clockwise and counterclockwise, respectively ((11)) due to the action of the sector gear to cause the leading end 10a of the film to be sent out by being guided with the upper and lower chutes 7a and 7b, so that the leading end of the film can be inserted into the slit of the spool 6. This causes the the locking hole 10c provided in leading end 10a of the film to be locked to the locking click 6b' provided in the slit 6b.

Figure 15G:
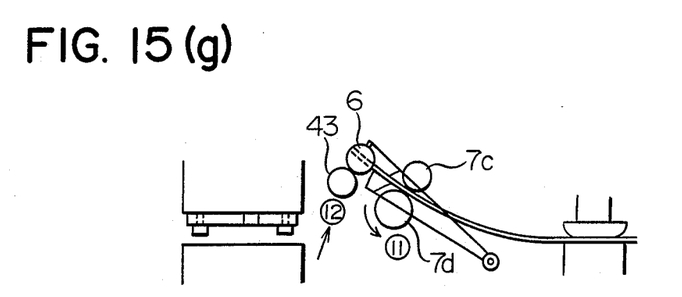

Then, the touch roller 43 at its standby position starts to ascend ((12))) to come into contact with the external circumference of the spool 6.

Figure 15H:
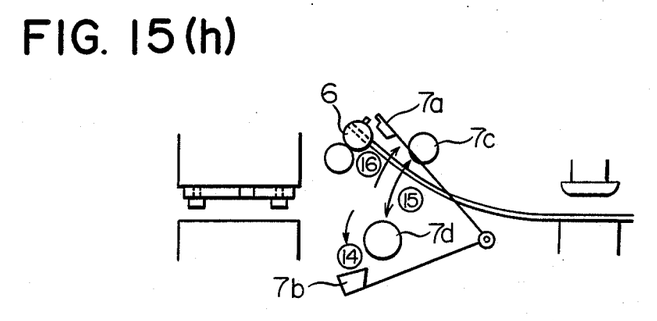

As shown in FIG. 15(h), the upper member 8a of the film holding device 8 moves upward ((13)) separating from the lower member 8b to release the film 10, and said lower chute 7b, nip rollers 7c and 7d and upper chute 7a return to their original positions almost simultaneously ((14) through (16)).

Figure 15I:
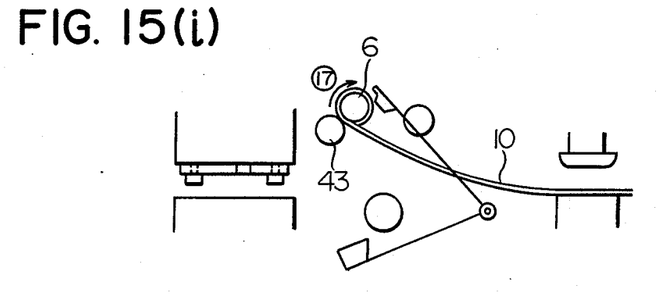

Then, as shown in FIG. 15(i), the drive device 15 connected to a spindle 5a of the spool chuck 5 is actuated to turn the spool 6 ((17)) for taking up the film 10.

The film scroll formed through the foregoing steps is held securely with the holding device (not shown in the drawing) to prevent the film scroll from becoming loose from its trailing end and transferred to the following process.

During the foregoing processes of the operation, as shown in FIG. 15(d), following the holding of the film 10 with the film holding device 8, the film measuring device 9 installed on the relevant nest starts to operate. The locking operation of the film locking device 7 and the measuring operation of the measuring device 9 take place almost simultaneously. Then, as illustrated in FIG. 15(i), the film cutting operation by the film cutting device installed on the following nest will be completed before the takeup of the film will be started by driving the spool.

In the above embodiment, the feed of the spools 6 to the spool chuck 5 is made from the direction which is inclined to the turret 1, while the film is fed from the side surface of the stationary frame so that the finished film scrolls can be recovered from the diagonally right direction. This layout, however, may be changed so that the spools are fed from the diagonally lower right direction, while the film is fed from below the turret, and the film scrolls are recovered from diagonally lower left direction.

Though the embodiment explained above is about the scroll of the photographic film, the present invention can be applied not only to it but also other types of scrolls.

As explained in the foregoing, the photographic film spool positioning mechanism according to the present invention comprising a drive shaft to drive the spool and a stopping device which comes into contact with the rib provided on the external circumference of the core of the spool is characterized by the backstop device provided to the drive shaft, so that when the position of the spool is determined by letting the rib provided on the external circumference of the spool driven by the drive shaft come into contact with the stopper, the backstop device provided on the middle of the drive shaft operates even when the turning speed of the spool is increased by increasing the torque of the motor, and thus the bouncing of the rib occurring when the rib comes into contact with the stopper, that is, the force acting against the rotational force of the motor to cause the spool to turn in reverse direction can be reduced to a negligible level and attenuated so soon that the time required for the completion of the positioning can be reduced substantially as an effect of the present invention.

Furthermore, the apparatus of the present invention is characterized by an upper chute with a front which is capable of sliding into contact with a spool set to the spool chucking device by a drive device from above, a lower chute capable of oscillating so as to come into contact with the bottom surface of the upper chute from under the film path line, and nip rollers capable of oscillating along the upper chute so as to hold the front end of the film between the upper chute and the nip rollers, as well as being capable of permitting the inserted leading end of the film to be sent out towards the spool, so that the operations for locking the ends of the films, formed after the film measuring and film cutting operations, to the slits of the spools, can be performed in parallel using uniform mechanisms. Thus, the spool positioning mechanism according to the present invention enables the reduction of the cycle time, reduction of the total dimensions of the mechanism, prevention of the disorder of the operation timing and the manufacture of the film scrolls through stable operation, which are some of the remarkable effects of the present invention.

What is claimed is:

1. A positioning device in a film winding apparatus for positioning a spool of photographic film, the spool having a core and a lateral rib formed on an external circumference of the core, around which a predetermined length of the photographic film is wound, the positioning device comprising:
   a spool chuck to hold the spool;
   a driving shaft in communication with the spool chuck for rotating the spool;
   a backstop means attached to the driving shaft for preventing the driving shaft from rotating;
   means for controlling a driving device connected with the driving shaft;
   a movable upper chute installed above a path line of the film, the movable upper chute including a stopping device which contacts the rib of the spool to stop rotation of the spool;
   means for controlling the stopping device to stop the rotation of the spool at a predetermined position;
   a movable lower chute installed below the path line of the film, the lower chute being selectively movable towards the path line of the film until the lower chute touches a lower surface of the upper chute; and
   upper and lower nip rollers installed in the vicinity of a film delivery point of the upper and lower chutes, where the upper and lower nip rollers pinch a leading part of the film, move the pinched leading part along the upper chute, and send the pinched leading part of the film to the spool.

2. The positioning device of claim 1 wherein the back stop means comprises a one-way clutch.

3. The positioning device of claim 1 wherein a tip of the movable upper chute is used as the stopping device for controlling the position of the spool by contacting the rib of the spool.

4. The positioning device of claim 3 wherein the lower nip roller moves upward towards the upper nip roller and the upper and lower nip rollers draw in the leading part of the photographic film as the lower nip roller moves upward.

* * * * *